No. 774,092. PATENTED NOV. 1, 1904.
J. LESLIE.
MANUFACTURE OF CARBONIC ACID.
APPLICATION FILED JULY 29, 1903.
NO MODEL. 2 SHEETS—SHEET 1.
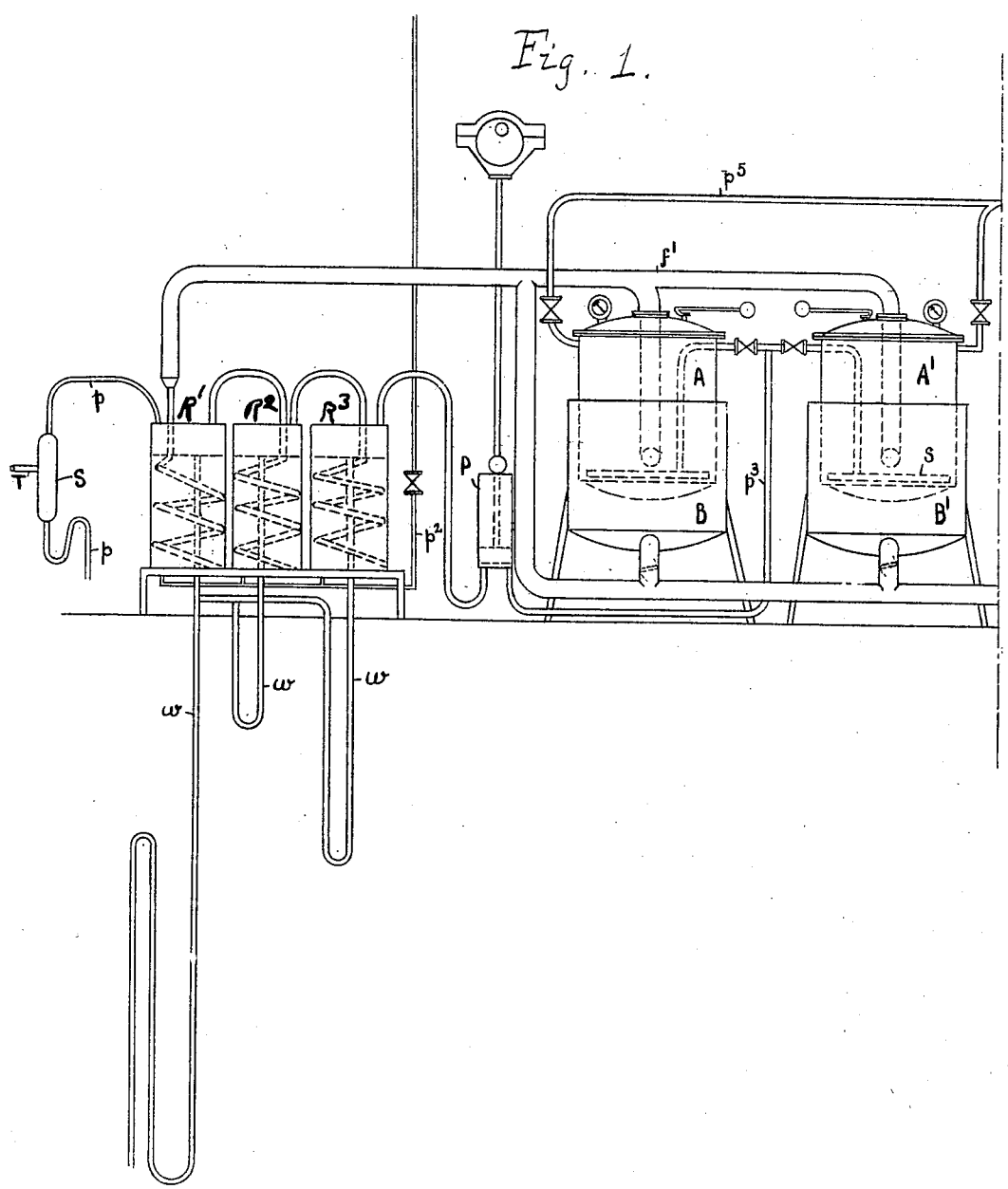

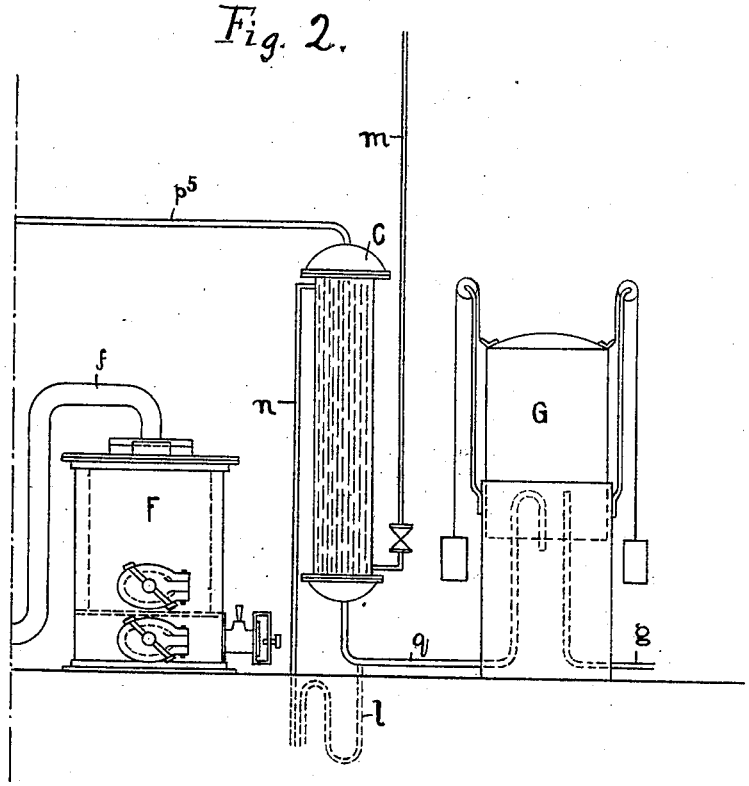

No. 774,092.

Patented November 1, 1904.

UNITED STATES PATENT OFFICE.

JAMES LESLIE, OF BELFAST, IRELAND.

MANUFACTURE OF CARBONIC ACID.

SPECIFICATION forming part of Letters Patent No. 774,092, dated November 1, 1904.

Application filed July 29, 1903. Serial No. 167,470. (No specimens.)

*To all whom it may concern:*

Be it known that I, JAMES LESLIE, chemist, a subject of the King of Great Britain, residing at Belfast, in the county of Antrim, Ireland, (whose post-office address is 3 Chlorine Gardens, Belfast, aforesaid,) have invented certain new and useful Improvements in the Manufacture of Carbonic Acid, (for which application has been made in Great Britain, No. 9,142, dated April 22, 1903,) of which the following is a specification.

This invention has for its object the manufacture of carbonic-acid gas by combustion of carbon, more especially as a small plant for use by aerated-water manufacturers. Hitherto plants of this nature have been so large as to be quite beyond the requirements of most aerated-water manufacturers. My apparatus incidentally, besides, enables the manufacturer to recover the very large amount of waste entailed in bottling in what is known in England as the "snifting" process. In this snifting a considerable quantity of gas, accompanied by more or less water, escapes with the air into the atmosphere. The result is that the filled bottles usually show an internal pressure of less than half that existing in the condensing-cylinder from which they are filled, over fifty per cent. of the gas being lost in snifting out the air. My invention differs from all such plants for making carbonic acid known to me in the following points:

First. The bicarbonating is done under a heavy pressure. The result is a remarkably quick and thorough absorption of the carbonic acid.

Secondly. My invention differs from the ordinary plants in that there is no circulation of the alkaline solution. This remains throughout the operation in the same vessel. Thus the leakage of the solution, such a heavy matter of loss and discomfort in other plants, is done away with and the amount of power required and the size and complexity of the plant are reduced to a minimum. I am by these means enabled to use small installations with economy.

The invention is best described by aid of the accompanying drawings, in which—

Figure 1 shows a diagrammatic elevation of a portion of my apparatus, and Fig. 2 shows a like view of the remaining portion.

In the drawings, F is a closed furnace in which charcoal or coke is burned and through which a current of air is forced or drawn by the pump P. The air passing through the burning carbon combines with the same, forming carbon dioxid, ($CO_2$.) $f$ is a pipe bringing this carbonic acid, along with the other gases present, to one or other of the jackets B and B' of two absorbing vessels A and A'. From these it passes out through the pipe $f'$ successively to the three purifiers R' R² R³, where it is cooled and purified by cold water brought through the pipe $p^2$. This water as it gets warm escapes through the trapped overflow-pipes $w$. The gases pass down purifier R' in a coil to the bottom, escaping through fine perforations in the coil close to the bottom, and rise to the surface, pass out through a pipe at the top and down a similar coil in R² in similar manner through a coil in R³. From thence they pass to the pump P, worked in any convenient manner. Pump P draws the gases from the purifiers and forces them with considerable pressure through pipe $p^3$ to one of the absorbers A or A', into which they pass through a rose or perforated annular pipe $s$. Here the carbonic acid combines with a solution of alkaline carbonate which fills the vessel nearly to the top. The remaining gases are allowed to pass away through the safety-valve. When it is found that the liquor is wholly or nearly bicarbonated in, say, A, the supply of cooled gases is cut off from it and passed to A', and the gases no longer pass through the jacket of A', but are passed through the jacket of A. These heating the bicarbonate solution convert it into monocarbonate, while a little steam and a large quantity of carbonic acid escape by the pipe $p^5$ into the tubular condenser C, in which it is surface-cooled by cold water passing in a reverse direction through the pipes $m$ and $n$. The condensed steam escapes through the siphon $l$ and the carbonic acid through the pipe $q$ to the gasometer ready for use. It will thus be seen that the whole apparatus is in part continuous and part intermittent. The carbonic acid is generated regularly, cooled by heating one of the absorbers, further cooled and purified in the vessels R' R² R³, then absorbed and separated from the accompanying gases in the other absorber, is afterward given out when the current has been changed in the jacket, is passed to the cooler, and thence to the gasometer.

T is a pipe leading from the snifting device into the chamber S, which can be of any convenient size. In chamber S the water separates and passes off by the trap-pipe $p$, while the mixed gas and air pass upward by the pipe $p'$ and enter the top of the first purifier R'. As, however, the snifted gases are free from all gaseous contamination except air, they can be brought into the top of the last purifier or the pipe from there to the pump.

It differs from all other such apparatuses known to me for this purpose in that the alkaline solution continuously remains *in situ*, being alternately bicarbonated and then deprived of one molecule of carbonic acid; second, the absorption takes place under considerable pressure instead of, as in other plants, at atmospheric pressure.

I declare that what I claim is—

1. The process of manufacturing carbonic acid which consists in burning carbon free of hydrogen in a confined space, cooling the resulting gases first by utilizing their heat to drive off the carbonic acid from a bicarbonate solution, then washing them in cold water, then driving them under strong pressure into intimate contact with an alkali monocarbonate solution from above which and while still under pressure the extraneous gases are allowed to escape and which solution is afterward heated under reduced pressure and the carbonic acid driven off, condensed and stored or utilized.

2. The process of manufacturing carbonic-acid gas, which consists in passing a mixture of carbonic acid and air or other neutral gases into water whereby it is cleaned and cooled, then pumping it under heavy pressure in fine streams through a solution of monocarbonate of an alkaline metal till the same is bicarbonated and nearly saturated with carbonic acid, allowing the neutral gas to escape while still under pressure, and then heating the solution at reduced pressure without removing the same, and passing the resulting carbonic acid and steam through a surface condensing device whereby the water is separated, and then storing the carbonic acid.

3. The improvement in the process of manufacturing carbonic acid, which consists in burning carbon in a confined space and using the heat of combustion to heat alkaline bicarbonate solution previously formed from monocarbonate and the crude gases, washing the crude carbonic acid in water and then passing it under pressure into intimate contact with a solution of alkali monocarbonate until the same is bicarbonated, then reversing the direction of the crude carbonic acid causing the heat of the same to drive off the pure carbonic acid with some steam from the bicarbonated solution, while the crude carbonic acid is being absorbed in alkali monocarbonate solution which has been deprived of its surplus carbonic acid.

In witness whereof I have hereunto signed my name, this 7th day of July, 1903, in the presence of two subscribing witnesses.

JAMES LESLIE.

Witnesses:
  ALEX. HARRIS,
  REGINALD SMITH.